(12) United States Patent
Biancardi

(10) Patent No.: US 11,162,248 B2
(45) Date of Patent: Nov. 2, 2021

(54) DEW CYCLE GENERATOR AND COLLECTOR

(71) Applicant: Robert P. Biancardi, Crown Point, IN (US)

(72) Inventor: Robert P. Biancardi, Crown Point, IN (US)

( * ) Notice: Subject to any disclaimer, the term of this patent is extended or adjusted under 35 U.S.C. 154(b) by 174 days.

(21) Appl. No.: 16/523,299

(22) Filed: Jul. 26, 2019

(65) Prior Publication Data

US 2021/0025147 A1    Jan. 28, 2021

(51) Int. Cl.
*E03B 3/28*    (2006.01)

(52) U.S. Cl.
CPC ...................... *E03B 3/28* (2013.01)

(58) Field of Classification Search
CPC ......... E03B 3/28; B01D 5/0042; F25B 21/02; Y02A 20/00
See application file for complete search history.

(56) References Cited

U.S. PATENT DOCUMENTS

| 2006/0065002 | A1* | 3/2006 | Seoane | B01D 5/009 62/291 |
| 2013/0098080 | A1* | 4/2013 | Biancardi | E03B 3/28 62/93 |
| 2018/0105410 | A1* | 4/2018 | Kim | B67D 3/0061 |

* cited by examiner

*Primary Examiner* — Elizabeth J Martin
(74) *Attorney, Agent, or Firm* — Greer, Burns & Crain, Ltd.

(57) ABSTRACT

A method and system for condensing water from ambient air at an ambient temperature. A dew extracting device with a dew extraction zone having a surface has the surface chilled to below dew temperature via a fluid refrigerant. The chilling of the surface is terminated once condensed liquid water is detected on the surface. The liquid water is removed from the surface and a temperature of the surface is allowed to rise above the dew point temperature, but remain below the ambient temperature. Then the process repeats to obtain additional liquid water.

20 Claims, 5 Drawing Sheets

DEW CYCLE GENERATOR AND COLLECTOR

FIELD OF THE INVENTION

The present invention relates to a device, method and control for extracting water in the form of dew from ambient atmosphere.

BACKGROUND OF THE INVENTION

Water is present in the ambient atmosphere in the form of moisture and this moisture will condense into droplets onto a surface (dew) when the surface is at or below a certain temperature (based upon relative humidity) referred to as the dew point. As the moisture condenses as dew, it releases a latent heat, that is, it releases energy without a change in temperature. This latent heat, however, must be dissipated or removed or it will cause the surface temperature to rise until it is above the dew point and droplets will no longer form. Further, the excess latent heat could also cause droplets that have already formed to evaporate back into atmospheric moisture.

Devices for extracting water from the atmosphere by cooling a surface to below the dew point are known. For example, such a device is described in applicant's earlier patent, U.S. Pat. No. 4,315,599, the disclosures of which are incorporated herein in their entirety. In that patent, a device, such as a Peltier device is used to continuously cool a surface below dew point to form a collection surface for condensed water droplets. Those condensed droplets are then harvested and utilized.

Another device and method is disclosed in U.S. Pat. No. 8,833,091 issued to applicant, the disclosures of which are incorporated herein in their entirety, which comprises a method and system for condensing water from ambient air. A dew extracting device with a dew extraction zone having surfaces has the surfaces chilled to below dew temperature for a first period of time. An air moving device directs a flow of air over the chilled surfaces so that liquid water condenses on the surfaces, raising the temperature of the surfaces. The chilling of the surfaces is terminated for a second period of time and liquid water is removed from the surfaces and heat of condensation is removed from the dew extraction zone. Then the process repeats to obtain additional liquid water.

Other devices, such as air conditioning units, include a coil through which a refrigerant flows which has been chilled to a temperature below dew point. Typically, a compressor is used to compress the refrigerant, from a gas to a liquid, and then the liquid flows through an evaporator where the temperature of the refrigerant drops as the refrigerant changes state from a liquid to a gas, thereby lowering the temperature of the coil. As air flows over the chilled coil, moisture in the air will condense on the coil. The latent heat released from the water moisture as the moisture condenses into droplets is transferred primarily to the refrigerant which must be cooled again, usually in a condenser, to in order for additional moisture to be condensed from the air.

In many parts of the world, fresh liquid water is in short supply, even though there is considerable water available in the atmosphere in such regions. However, the costs involved in running a compressor continuously to dissipate the latent heat released from the moisture as it condenses into droplets are very high and the size and costs of the compressors needed for operating on such a continuous manner are quite large, rendering the possibility of using such systems for obtaining usable amounts of fresh liquid water rather low.

Consequently, it can be seen that the need exists for a system that can extract water from the atmosphere, such as in the form of dew, in reasonable quantities at reasonable costs.

SUMMARY OF THE INVENTION

A method and system for generating and collecting dew from ambient air is provided. A dew extracting device with a dew extraction zone having a surface has the surface chilled to below dew temperature. This chilling is performed with the use of a fluid refrigerant that has been chilled in a reservoir, a wall of which may be in thermal communication with the surface of the dew extraction zone. During this chilling, the surface will become saturated with dew.

Once dew has saturated the surface, the chilling of the refrigerant is terminated and liquid water is removed from the surface, such as by gravity, a shaking or vibration of the surface, or by a wiper moving across the surface, and heat of condensation causes the surface of the dew extraction zone, and the fluid refrigerant, if present, to rise above the dew point temperature. This termination of chilling will last long enough to collect the condensed dew and to allow the surface to rise above the dew point temperature, such as by a few degrees, but not so long as to allow the surface temperature to rise to the ambient temperature. Then the process repeats in what is referred to herein as a dew cycle, by again chilling the refrigerant and the surface to below dew point temperature to obtain additional liquid water on the surface and to terminate chilling to collect the condensed water.

Also, sanitizing device, for example, a UV light source, may be used to prevent growth of bacteria on the dew extraction zone surfaces. Parts or all of the system may be powered through the use of solar, water or wind generated electrical energy.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DETAILED DESCRIPTION OF THE PREFERRED EMBODIMENTS

A dew extracting device 20 of the present invention as shown schematically in FIGS. 1-4, includes a number of components that are operated in a process to generate and collect dew from the ambient air while reducing the energy required to do so as compared to other devices that cause moisture in the air to condense into droplets.

Figure 1:
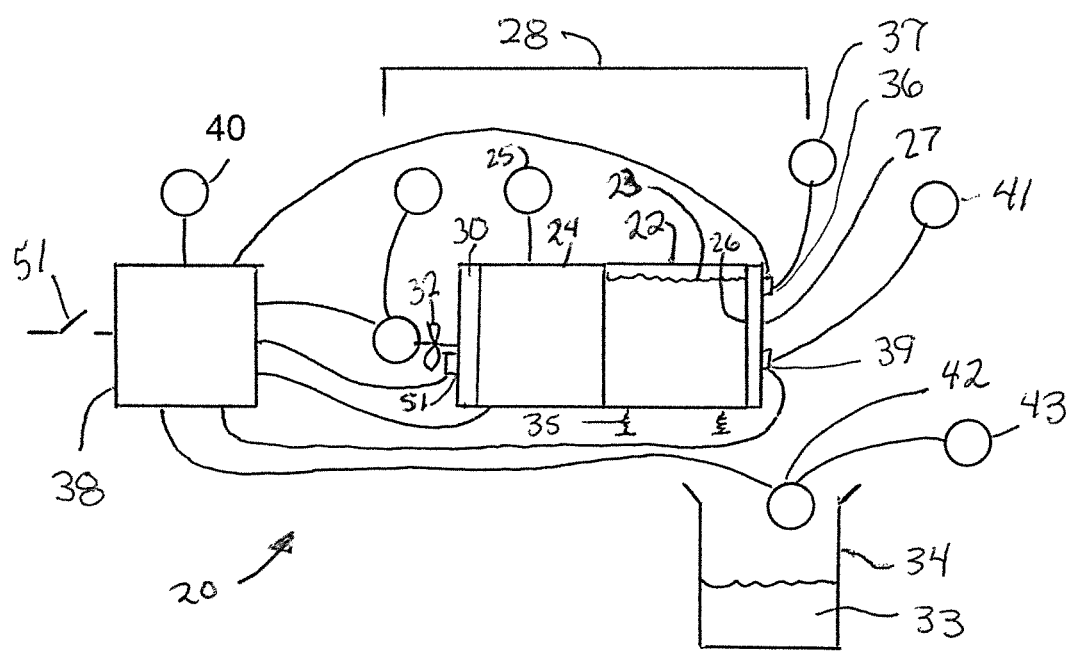
FIG. 1 is a schematic illustration of components of a dew extracting device embodying the principles of the present invention.
Figure 2:
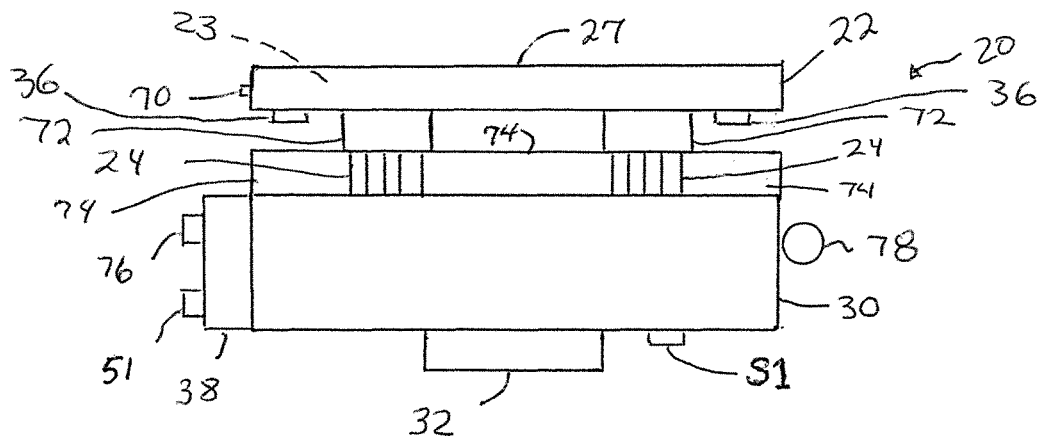
FIG. 2 is a schematic top view illustration of components of an embodiment of a small scale dew extracting device embodying the principles of the present invention.
Figure 3:
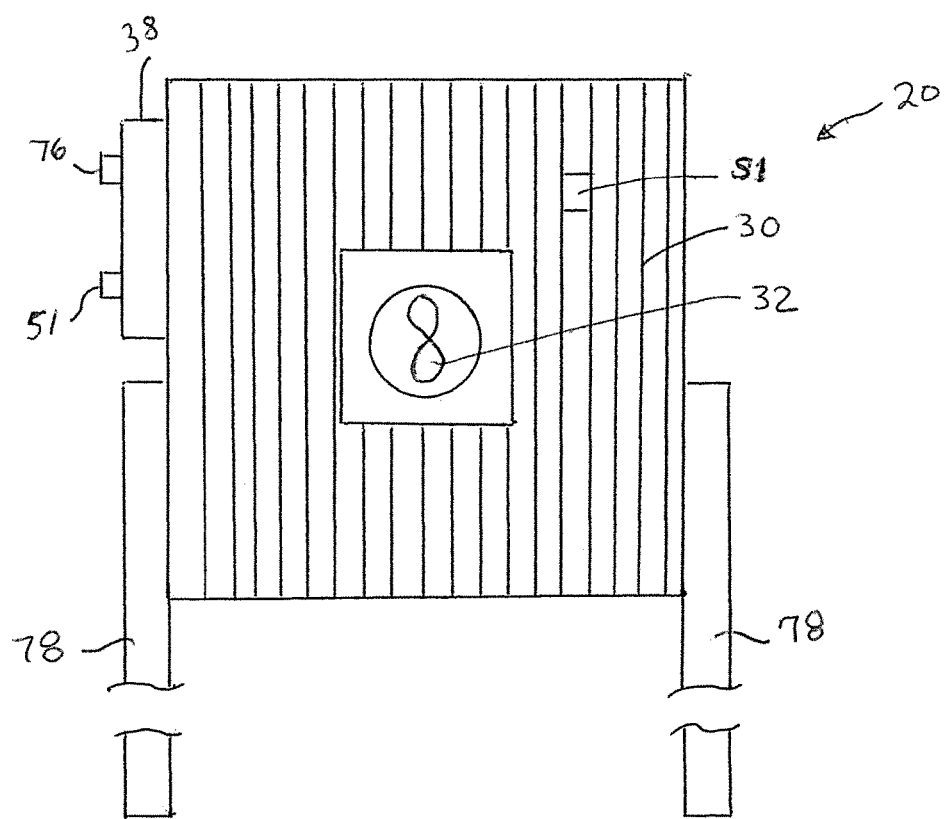
FIG. 3 is a schematic rear view illustration of components of an embodiment of a small scale dew extracting device embodying the principles of the present invention.
Figure 4:
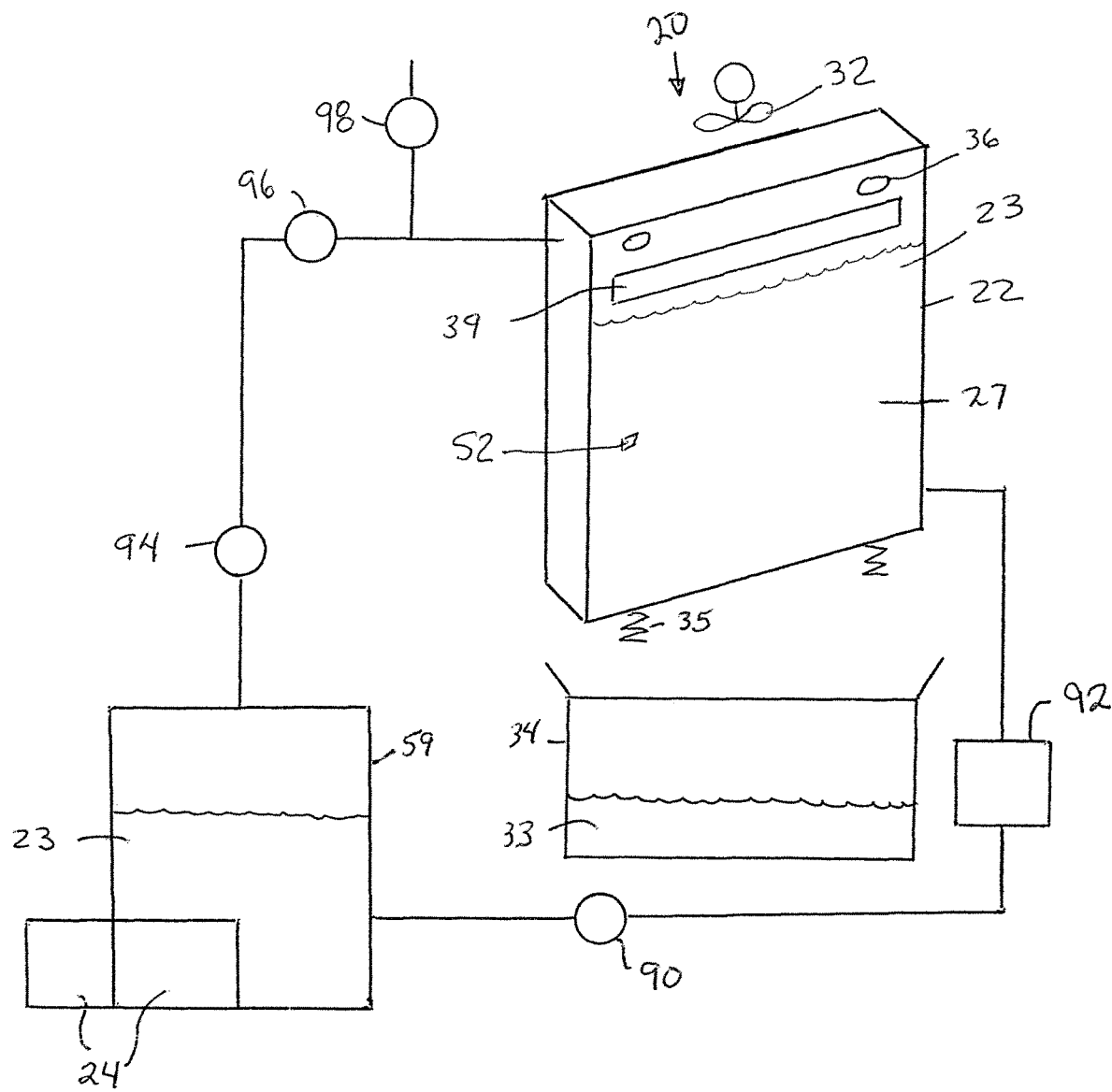
FIG. 4 is a schematic illustration of components of an embodiment of a large scale dew extracting device embodying the principles of the present invention.

The dew extracting device 20 includes a reservoir 22, such as a tank for holding a first refrigerant fluid 23, such as an antifreeze fluid, or some other type of fluid that is capable of having its temperature lowered to at or near the freezing temperature of water, without freezing. A refrigeration system 24 is arranged to cool the first refrigerant fluid 23 in the reservoir 22. This refrigeration system 24, as shown in FIG. 4, particularly in larger scale systems, such as drinking water systems of the type as disclosed in my previous U.S. Pat. No. 8,833,091, whose disclosure is incorporated herein by reference, may be a conventional compressor driven arrangement utilizing a compressor, evaporator and a pump, in which a second refrigerant fluid is alternately compressed, cooled and evaporated to reduce the temperature of the first refrigerant fluid 23, and then a suitable heat exchanger is provided to absorb heat from the first refrigerant fluid in the reservoir (which is a different fluid from the second refrigeration fluid of the refrigeration system). Other known types of refrigeration or chilling systems 24, particularly in smaller scale systems as shown in FIGS. 2-3, such as plant and vegetation watering systems, may include a thermoelectric device, for example, those that use the Peltier effect, or other known thermoelectric devices, to effect a chilling of the fluid 23 in the reservoir 22.

While the refrigeration system 24 may be powered by regular grid electrical power, the refrigeration system may also, or alternatively, be powered by a power source 25 such as electricity which may be generated by solar cells or wind or water power systems, or battery power, in areas where desired, such as when distributed electrical power is not readily available, or simply to operate the refrigeration system without relying on grid power.

At least one of the walls 26 of the reservoir 22 is in thermal communication with the first refrigerant fluid 23 in the reservoir 22 and with a surface 27 in a dew extraction zone 28 which acts as a dew collecting surface. The remaining walls 26 may be insulated to thermally isolate the first refrigerant fluid 23 from the ambient temperature or one or more of the remaining walls may act as a surface 27 for collecting dew. There may be provided fins or other surface area enhancing features on the surface 27 of the dew extracting zone 28, although these are not required. In all instances, however, the surface 27 in the dew extraction zone 28 will be in thermal communication with the first refrigeration fluid 23 in the reservoir 22, at least while the surface 27 is being chilled.

A temperature sensor S1 is associated with the dew extraction zone 28. This temperature sensor S1 may be a thermocouple, thermo switch, or other type of temperature sensor that is mounted directly to the surface 27 in the dew extraction zone 28, or other mounting arrangement such that the sensor can measure a temperature on or near the surface 27 in the dew extraction zone 28, or other surface or component whose temperature is affected by the dew condensation. For example, if a thermoelectric device is used as the refrigeration system 24, it may include a heat sink 30 whose temperature varies as the dew condenses on the surface 27. In a prototype unit, it has been discovered that the temperature of the heat sink 30 rises by about 5 degrees F. when the surface 27 of the dew extraction zone 28 is saturated with water. It is believed that this occurs because when the dew condenses on the surface 27 a heat of condensation is absorbed by the surface 27 and thermally transmitted through the first refrigerant fluid 23 to the heat sink 30, causing the temperature of the heat sink to rise. This detectable temperature rise can be sensed and used, as described below, to determine when the dew is ready for harvesting from the surface 27.

Although not necessary, optionally an air moving device 32, such as a motor driven fan, may be arranged to direct a flow of ambient air over the dew extraction zone 28. In the small scale system, a fan 32 may be used to cool the heat sink 30, which provides sufficient air movement to move ambient air over the surface 27. In the large scale system, a separate air moving device 32 may be used to direct a flow of air over the surface 27. Any type of device 32, such as a squirrel cage blower, a bladed fan, or other air moving device, such as driven by a brushless DC motor, may be used to cause a flow of ambient air to pass over the surface 27 of the dew extraction zone 28 when the air moving device is energized. The air moving device 32 may be powered by regular grid electrical power, the air moving device may also, or alternatively, be powered by a power source 33 such as electricity which may be generated by solar cells or wind or water power systems, or battery power, in areas where desired, such as when distributed electrical power is not readily available, or simply to operate the air moving device without relying on grid power.

A collection container 34 may be arranged to communicate with the dew extraction zone 28, such as by its physical placement or via a conduit or funnel, so that it is arranged to receive condensed liquid water droplets 33 from the dew extraction zone 28. For example, the collection container 34 may be placed below the dew extraction zone 28 and the water droplets may fall into the collection container 34 from the dew extraction zone 28 by operation of gravity. Alternatively, the water droplets may be allowed to fall directly onto a point of utilization, such as soil.

Optionally, a dew harvesting device, for example, a vibrating mechanism 36, may be provided to induce a shaking or vibrating movement to the surfaces of the dew extracting zone 28 to enhance the removal of condensed water vapor from those surfaces. A number of different types of mechanisms may be employed as the vibrating mechanism 36 including a rotary shaft with an eccentric weight, a reciprocating plunger, or other well known vibration inducing mechanisms. Other types of dew harvesting devices, such as one or more wipers 39 that can be rubbed across the surface 27 of the dew extracting zone 28 may be used. The surface 27 of the dew extraction zone 28, with or without fins, may be mounted to permit or enhance shaking or vibrational movement, such as by mounting on resilient members 35, for example springs or rubber grommets. The vibrating mechanism 36 may be powered by regular grid electrical power, the vibrating mechanism may also, or alternatively, be powered by a power source 37 such as electricity which may be generated by solar cells or wind or water power systems, or battery power, in areas where desired, such as when distributed electrical power is not readily available, or simply to operate the vibrating mechanism without relying on grid power. The wiper 39, if used, may be powered by regular grid electrical power, the wiper may also, or alternatively, be powered by a power source 41 such as electricity which may be generated by solar cells or wind or water power systems, or battery power, in areas where desired, such as when distributed electrical power is not readily available, or simply to operate the vibrating mechanism without relying on grid power.

A controller 38 is provided for operating the various components of the dew extracting device in accordance with a process embodying the principles of the present invention. The controller 38 is arranged to be in controlling communication, as shown schematically with unnumbered control lines, with the refrigeration system 24 and the air moving device 32, in part based on signals from the temperature sensor S1 as described below. If a vibrating mechanism 36 is employed, its operation may also be controlled by the controller 38. As an example, the controller 38 may include a programmable logic control to operation the system through the various steps described herein. Other types of controllers could also be used.

The controller 38 may be powered by regular grid electrical power, the controller may also, or alternatively, be powered by a power source 40 such as electricity which may be generated by solar cells or wind or water power systems, or battery power, in areas where desired, such as when distributed electrical power is not readily available, or simply to operate the controller without relying on grid power. This power source 40 may be the single power source for all of the powered equipment, with power provided through the control lines, rather than separate power sources for each piece of equipment as schematically illustrated.

Another optional feature is a sanitizing device 42, such as UV light source which may be located in the dew extraction zone 28 to minimize, reduce or remove any bacteria on the surfaces of the dew extraction zone 28. The UV light source 42 could be arranged to irradiate the surface 27 of the dew extraction zone 28. Alternately, the UV light source 42 could be positioned to irradiate collected condensate as it passes from the dew extraction zone 28 into the collection container 34, or once the condensate is located in the collection container. Other types of sanitizing devices 42, such as heaters to boil the collected water, or chemical dispensers, may be utilized. The sanitizing device 42 may be powered by regular grid electrical power, the sanitizing device may also, or alternatively, be powered by a power source 43 such as electricity which may be generated by solar cells or wind or water power systems, or battery power, in areas where desired, such as when distributed electrical power is not readily available, or simply to operate the sanitizing device without relying on grid power. Operation of the sanitizing device 42 may be controlled by the controller 38.

The various power sources 25, 33, 37, 40, 41, 43 may originate from the same source, or may have different sources. If different voltages are required for operation of various components by the various power sources, then appropriate transformers and other conventional circuit elements may be used.

In a particular embodiment of the invention, as shown schematically in FIGS. 2-3, referred to as a small scale device, the reservoir 22 may comprise a hollow tank with a fill port 70 which allows for a one-time filling of the tank with the fluid refrigerant 23, which may comprise an alcohol-water solution. The reservoir may have dimensions such as 6 inches by 6 inches, with a thickness of one half inch, and made from ⅛th inch thick aluminum, to provide a dew collecting surface 27 with a size of 36 square inches. Other sizes may be used, with larger surfaces providing a greater amount of water collected during each dew cycle. Two thermoelectric devices 24 may be electrically connected in series to provide a chilling of the fluid 23 in the reservoir 22 via thermal communication provided by aluminum blocks 72 positioned between the thermoelectric devices 24 and the reservoir 24. A separate plate, such as ⅛ inch thick aluminum, may be provided between the thermoelectric devices 24 and the blocks 72 to assist in the heat transfer, and to provide a more even distribution of the cooling provided by the thermoelectric devices. A finned heat sink 30 may be provided to remove heat from the thermoelectric devices 24, which is shielded from the reservoir 22 by insulation blocks 74. A fan 32 may be provided to cool the heat sink 30, which also causes sufficient air flow around the dew collecting surface 27 to provide a continuous flow of ambient air over that surface. An indicator light 76 may be provided on the control unit 38 to give an indication of when the refrigeration system 24 is in operation. A separate indicator light may be provided to indicate that the power switch 51 is positioned to have the entire system in operation. The dew extracting device 20 may be provided with mounting rods 78, which can either support the dew extracting device 20 on a surface, or may extend into the surface, such as soil, for example when the dew extracting device is being used to provide liquid water to the soil.

The dew harvesting devices 36, in the form of vibration devices may be mounted directly on the reservoir 22 to provide a shaking of the surface 27.

Figure 5:
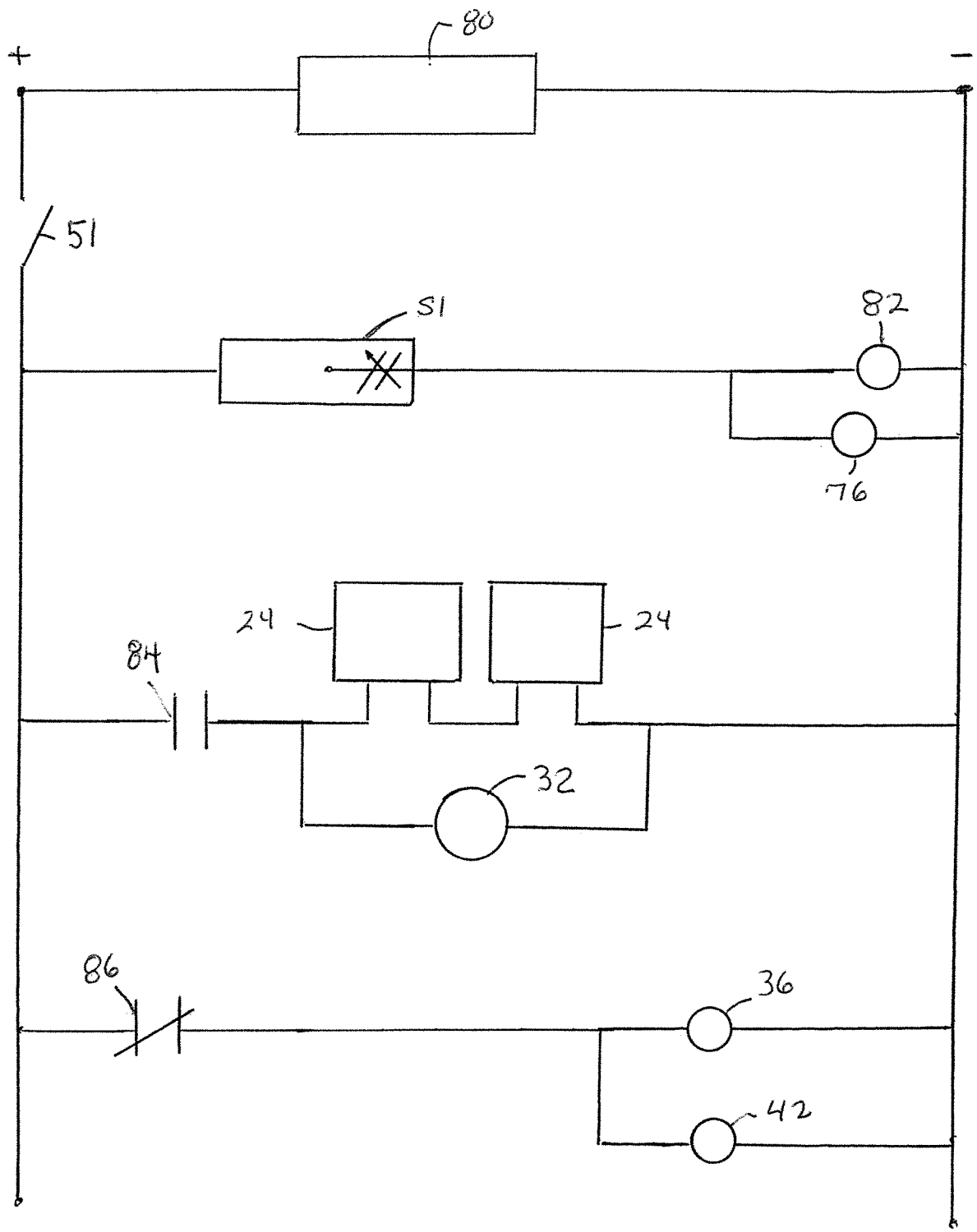
FIG. 5 is a schematic illustration of a control circuit of an embodiment of a small scale dew extracting device embodying the principles of the present invention.

The electrical schematic for the small scale dew collecting device 20 is shown in FIG. 5, and includes a power source 80, which may be an AC to DC power converter, such as providing a 13 V DC output at 4.6 amps from 120 V AC line input. Other types of power supplies may be used, including battery power.

The power switch 51 provides electric power to the remainder of the circuit, when manually closed by a user. The temperature sensor S1, in the form of an adjustable thermoswitch has been found to provide the desired detection of dew collection when set to open at 85 degrees F., and to close at 75 degrees F. Thus, when the system is operating at an ambient temperature of 72 degrees F., the temperature of the heat sink will rise to about 80 degrees F. while the refrigerant fluid 23 in the reservoir 22, and thus the surface 27, is being cooled to below the dew point temperature. Once dew has collected on the surface 27, the temperature of the heat sink will rise about 5 degrees to 85, at which point the switch S1 will open, thereby removing power from the main relay 82 and the indicator light 76. The main relay, when not powered, will cause a normally open switch 84 to open, thereby terminating power to the thermoelectric devices 24 and the fan 32. At the same time, the main relay will also cause the normally closed switch 86 to close, thereby powering the dew harvesting device 36 and the sanitation device 42. As the heat sink 30 cools, due to no power being provided to the thermoelectric devices 24, the temperature will drop so that the thermoswitch S1 will sense when the temperature reaches 75 degrees, causing the thermoswitch to close.

When the thermoswitch S1 closes, power will again be provided to the main relay 82 which will cause the switch 84 to close, returning power to the thermoelectric devices 24 and the fan 32, to re-cool the surface 27. The relay 82 will also cause the switch 86 it open, thereby removing power from the vibration device 36 and the sanitation device 42.

In a particular embodiment of the invention, as shown schematically in FIGS. 2-3, referred to as a large scale device, the same major components are provided as discussed above. In this system, a difference is that when the power to the refrigeration system 24 is terminated, a pump 90 is energized and a valve 92 is opened, so that the fluid refrigerant 23 is removed from the reservoir 22. When the temperature of the surface 27 increases above the dew point temperature, but below ambient temperature, such as detected by a temperature sensor S2, then a pump 94 is energized and a valve 96 is opened, so that the fluid refrigerant 23 is returned to the reservoir 22. An air check valve 98 may be provided in the refrigerant return line, as needed.

A fan 32 may be provided to cause a flow of ambient air directly over the surface 27.

Figure 6:
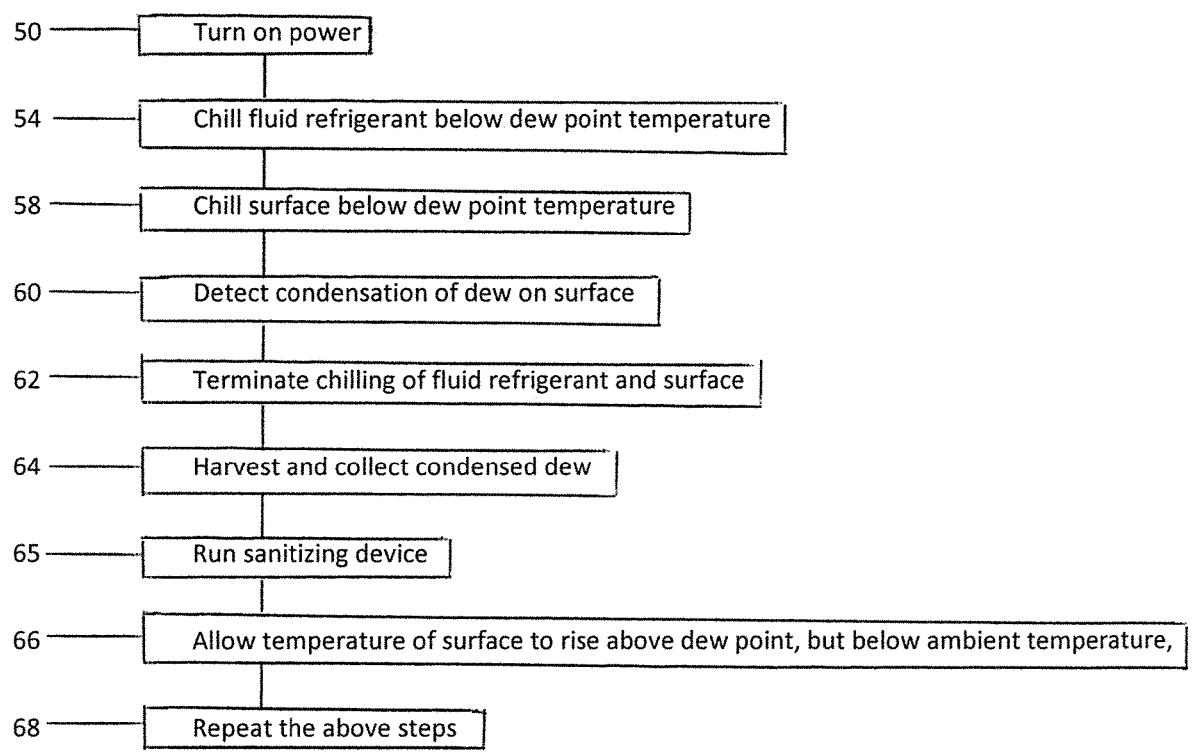
FIG. 6 is a schematic flow chart of the steps undertaken in a process of operation a dew extracting device according to the principles of the present invention.

The process of operating the dew extracting device 20 in accordance with the principles of the present invention is shown in the flow chart of FIG. 6 and is described below.

In step 50 a user begins the dew harvesting cycle by pressing a power button or power switch 51 that may be contained on a panel of the controller 38. A predetermined temperature, likely to nearly always be below the dew point temperature, such as 34 degrees F., may be used as a temperature to chill the fluid refrigerant 23. In step 54 the refrigeration system 24 is run to chill the fluid in the reservoir 22. This leads to step 56 in which the surface 27 is chilled below dew point temperature. In the small scale unit of FIGS. 2-3, the fluid refrigerant remains in the reservoir 22, and as the refrigerant is chilled, the surface 27 will be chilled due to the direct contact, and therefore thermal communication between the fluid refrigerant 23 and the surface 27. In the large scale unit of FIG. 4, the refrigerant may be stored in a separate reservoir 59 while the dew is being harvested (see U.S. Pat. No. 8,833,091) and only returned into thermal contact with the surface 27 when properly chilled. In step 60 the condensation of dew on the surface is detected, such as by the temperature sensor S1, and when this occurs, in step 62, the chilling of the refrigerant and the surface 27 is terminated. In the small scale unit of FIGS. 2-3, this occurs simply by terminating power to the thermoelectric device 24 and leaving the fluid refrigerant in the reservoir 22. In the large scale unit of FIG. 4, this occurs by terminating power to the refrigeration system 24 and removing the fluid refrigerant 23 from the reservoir 22. When the dew has collected on the surface 27, the temperature sensor S1 detects this and the process moves to step 58 where operation of the refrigeration system 24 is terminated, removing the power consumption associated with the refrigeration system 24.

The process next moves to step 64 in which the condensed dew is harvested. This may mean that dew harvesting device 36 (if utilized) begins operation, or simply the dew is allowed to drip from the surface 27, which may begin to occur even while the refrigeration system 24 is still operating. Since moisture in the air will condense on the surface 27 as droplets, releasing energy in the form of heat of condensation, the surface 27 will warm to a temperature above dew point. Some of the heat given off during condensation will be absorbed by the first refrigeration fluid 23 in the reservoir 22, if present. The dew harvesting device 36, 39 may be used to enhance the removal of condensed water 33 from the surface 27 of the dew extraction zone 28 and to cause the condensed water to flow, preferably via gravity, into the water collection container 34 or other point of utilization.

Optionally the process includes step 65 which includes operating the sanitizing device 42 in the dew extraction zone 28 (or wherever the sanitizing device is located) to minimize, reduce or remove any bacteria on the surfaces of the dew extraction zone 28 or in the collected water.

Regardless of the inclusion of step 65, the process then continues to step 66 where the temperature of the surface 27 is allowed to rise above dew point temperature, but below ambient temperature. For example, the temperature of the surface 27 may rise by about 5 degrees F. above dew point.

Once the temperature of the surface 27 has risen, then in step 68, the steps 54 to 66 are repeated for as long as water is desired to be collected. When a thermo switch is used as the temperature sensor S1, the switch will automatically close the connection between power 25 and the refrigeration unit 24 upon a predetermined change in temperature, thereby moving automatically to step 54. In a larger scale unit, a separate temperature sensor may be associated with the surface 27 to determine when its temperature has risen sufficiently above dew point, but below ambient temperature, to reenergize the refrigeration unit 24.

The entire operation may be terminated at any time by the user pressing the power button or switch 51 at the control panel.

The value of the present apparatus and process is that the temperature of the first refrigeration fluid 23 in the reservoir 22, and therefore the surface 27 of the dew extraction zone 28, is raised only slightly above the dew point temperature between each cycle, thereby minimizing the amount of additional re-cooling of the first refrigeration fluid that is required for each dew generating and collecting cycle.

The surface 27 is cleared of collected dew by the dew harvesting device, with the surface temperature rising slightly above the dew point temperature. It has been discovered that by allowing the temperature of the surface 27 to rise above the dew point temperature, and then re-cooling the surface below dew point temperature, increases the condensation of dew on the surface during each cycle.

Although a specific arrangement of components and steps for the use and operation of those components is described above with respect to a particular embodiment of the invention, not all of the components arranged in the manner described are required for the present invention. Various modifications to the timing of certain events, such as the start of the optional air moving device 32, the start and stop of the optional dew harvesting device 36 could be made to start or stop such operations at different times, so long as the principles of the present invention are maintained.

A more general description of a method embodying the present invention of condensing water from ambient air using a dew extracting device with a dew extraction zone having surfaces includes the steps of:

chilling a surface in the dew extraction zone to below dew point temperature, terminating the chilling of the surface and removing liquid water from the surface from the dew extraction zone, allowing the temperature of the surface to rise above the dew point temperature, but below ambient temperature, and repeatedly repeating the foregoing steps.

Thus, an advantage of the present invention is to stop chilling first refrigeration fluid 23 and the surface 27 of the dew extraction zone 28 at various times during the dew extraction process so that condensed water (dew) is removed, and the temperature of the surface of the dew extraction zone is elevated above dew point. This allows a new cycle of reducing the temperature of the surface below dew point and generating a new quantity of dew to be initiated. The temperature of the surface 27 of the dew extraction zone rises only a few degrees above the dew point temperature between each cycle, thereby minimizing the chilling required by the refrigeration system of the first refrigeration fluid 23 during each cycle. This allows for a reduced energy requirement for operating the system of the invention.

The reduced energy requirement for the present system allows a device embodying the principles of the present invention to be used in locations having limited energy supplies and locations where only solar, wind or water power, or battery power, might be available. Also, the cost of operating a system, based on a unit of recovered liquid water, would be substantially lower than the cost for operating a system where all of the heat of condensation is continuously absorbed into the chilling medium.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method of condensing water from ambient air at an ambient temperature using a dew extracting device with a dew extraction zone having a surface comprising the steps:
   chilling the surface in the dew extraction zone with a fluid refrigerant to below a dew point temperature until there is a detection of a saturation of dew collecting on the surface by sensing a predetermined temperature change associated with the surface,
   upon sensing the predetermined temperature change, terminating the chilling of the surface without a time delay,
   removing liquid water from the surface,
   after the termination of the chilling of the surface, waiting for a rise in temperature of the surface in the dew extraction zone above the dew point temperature but below the ambient temperature, and then
   repeating the foregoing steps.

2. The method according to claim 1, wherein the surface in the dew extraction zone is chilled by the fluid refrigerant through a wall in a reservoir of the fluid refrigerant.

3. The method according to claim 2, wherein the fluid refrigerant remains in the reservoir while the liquid water is removed from the surface.

4. The method according to claim 1, wherein the ambient air is flowed over the surface in the dew extraction zone by operation of an air moving device.

5. The method according to claim 1, wherein liquid water is removed from the surface by operation of gravity.

6. The method according to claim 5, wherein the step of removing the liquid water from the surface comprises operating a dew harvesting device associated with the chilled surface.

7. The method according to claim 6, wherein the step of removing the liquid water from the surface includes shaking the surface to dislodge water condensed on the surface.

8. The method according to claim 6, wherein the step of removing the liquid water from the surface includes wiping the surface to dislodge water condensed on the surface.

9. A system for extracting liquid water from ambient air at an ambient temperature comprising:
   a dew extraction zone having a surface,
   a controller,
   a chilling mechanism operated by the controller to chill the surface in the dew extraction zone with a fluid refrigerant to below a dew point temperature,
   a sensor configured to sense a predetermined temperature change associated with the surface indicating that the surface is saturated with condensed dew,
   the controller configured to terminate operation of the chilling mechanism after the sensor senses the predetermined temperature change,
   the controller configured to resume operation of the chilling mechanism after a sensed temperature of the surface rises above the dew point temperature, but below the ambient temperature and to continue a cycle of chilling the surface and termination of chilling the surface.

10. The system according to claim 9, further including a collection zone arranged to collect the liquid water that has condensed on the surface.

11. The system according to claim 9, further including an air moving device operated by the controller and arranged to flow the ambient air over the chilled surface so that liquid water condenses on the surface.

12. The system according to claim 9, wherein the chilling mechanism includes a refrigeration system for chilling the fluid refrigerant in a reservoir.

13. The system according to claim 9, wherein the controller comprises a temperature sensor for detecting a temperature in the dew extraction zone.

14. A method of condensing water from ambient air at an ambient temperature using a dew extracting device with a dew extraction zone having a surface, comprising the steps:
   chilling the surface in the dew extraction zone with a fluid refrigerant to below a dew point temperature,
   detecting a saturation of condensation of liquid water on the surface based on a predetermined temperature rise associated with the surface,
   upon detecting the predetermined temperature rise, terminating the chilling of the surface without a time delay,
   removing condensed liquid water from the surface,
   thereafter allowing the temperature of the surface to rise above the dew point temperature, but below the ambient temperature, and
   resuming the chilling of the surface and repeating the foregoing steps.

15. The method according to claim 14, including a step of shaking the surface to dislodge the liquid water condensed on the surface.

16. A system for extracting liquid water from ambient air at an ambient temperature comprising:
   a reservoir for holding a fluid,
   a refrigeration system arranged to cool the fluid in the reservoir,
   a surface in a dew extraction zone arranged to be in thermal communication with the fluid in the reservoir,
   a temperature sensor associated with the dew extraction zone,
   a controller connected to the temperature sensor and configured to operate the refrigeration system,
   wherein the controller is configured to operate the refrigeration system to cool the fluid in the reservoir to a first temperature below a dew point temperature and thereafter to terminate operation of the refrigeration system without a time delay, upon a detection of a saturation of condensation on the surface by the temperature sensor, and to allow a temperature of the surface to rise above the dew point temperature but below the ambient temperature, and thereafter to repeat the operation and termination of operation of the refrigeration system.

17. The system according to claim 16, further including a collection container communicating with the dew extraction zone and arranged to receive condensed water droplets from the dew extraction zone.

18. The system according to claim 16, wherein the refrigeration system comprises a compressor, an evaporator and a condenser.

19. The system according to claim 16, wherein the refrigeration system comprises a thermoelectric device.

20. The system according to claim 16, including a vibrating mechanism associated with the surface in the dew extraction zone to shake the surface when activated.

\* \* \* \* \*